(12) United States Patent
Cho et al.

(10) Patent No.: US 8,355,744 B2
(45) Date of Patent: Jan. 15, 2013

(54) ENHANCING UPLINK LINK BUDGET IN OFDMA COMMUNICATION SYSTEMS

(75) Inventors: Bong Youl Cho, Seoul (KR); Shailender B. Timiri, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 12/059,956

(22) Filed: Mar. 31, 2008

(65) Prior Publication Data

US 2009/0247209 A1 Oct. 1, 2009

(51) Int. Cl.
*H04B 7/00* (2006.01)
(52) U.S. Cl. ....... 455/522; 455/69; 455/13.4; 455/452.2
(58) Field of Classification Search .................. 455/522, 455/69, 434, 13.4, 515, 517, 67.11, 127.1, 455/126, 502, 452.1, 509, 452.2; 370/210, 370/343, 330, 342
See application file for complete search history.

(56) References Cited

U.S. PATENT DOCUMENTS

| 2004/0001429 A1* | 1/2004 | Ma et al. ........................ 370/210 |
| 2005/0135324 A1* | 6/2005 | Kim et al. ...................... 370/343 |
| 2010/0215017 A1* | 8/2010 | Li et al. ......................... 370/330 |

* cited by examiner

*Primary Examiner* — John J Lee
(74) *Attorney, Agent, or Firm* — Sutherland Asbill & Brennan LLP

(57) ABSTRACT

Methods and apparatus to enhance uplink link budget in Orthogonal Frequency-Division Multiple Access (OFDMA) communication systems are described. In one embodiment, a wireless device may increase its transmit power and/or perform subchannel repetition (e.g., in a WiMAX environment) based on at least one indication by an access point. Other embodiments are also described.

16 Claims, 4 Drawing Sheets

ENHANCING UPLINK LINK BUDGET IN OFDMA COMMUNICATION SYSTEMS

FIELD

The present disclosure generally relates to the field of communication. More particularly, an embodiment of the invention generally relates to enhancing uplink link budget in Orthogonal Frequency-Division Multiple Access (OFDMA) communication systems.

BACKGROUND

Modern computer systems may use wireless communication, for example, in instances where a hardwired communication connection is unavailable. Moreover, wireless communication may be made available without incurring the costs associated with provision of infrastructure to support a wired connection. However, as demand on wireless communication systems increases, the need to improve wireless communication bandwidth and efficiency also increases.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide for a mobile station (hereinafter "MS," which may be a client wireless device), e.g., in mobile WiMAX or Worldwide Interoperability for Microwave Access (or other communications) system, to enhance uplink link budget. Generally, WiMAX is a telecommunications technology aimed at providing wireless data over long distances, e.g., in accordance with Institute of Electrical & Electronics Engineers (IEEE) 802.16 Working Group on Broadband Wireless Access Standards, which was established by IEEE Standards Board in 1999, aiming to prepare formal specifications such as IEEE std 802.16-2004, IEEE std 802.16e-2005, etc. for the global deployment of broadband Wireless Metropolitan Area Networks. In an embodiment, MS may send its data more reliably when it is located in cell edge area. For example, a wireless device may increase its transmit power, e.g., with subchannel repetition and/or power density increase (such as coordinated between an access point and an MS) in an embodiment. Thus, information communicated via a subchannel may be repeated (e.g., in frequency domain) in an embodiment.

Additionally, even though the term "mobile WiMAX" is used herein, embodiments of the invention are not bounded by mobile WiMAX system may be readily applied to any communications systems, e.g., where OFDMA is used in uplink of the communication system. Generally, OFDMA is a multi-user version of the Orthogonal Frequency Division Multiplexing (OFDM) digital modulation scheme. Multiple access may be achieved in OFDMA by assigning subsets of subcarriers to individual users (or wireless devices). This allows simultaneous low data rate transmission from several users.

Figure 1:
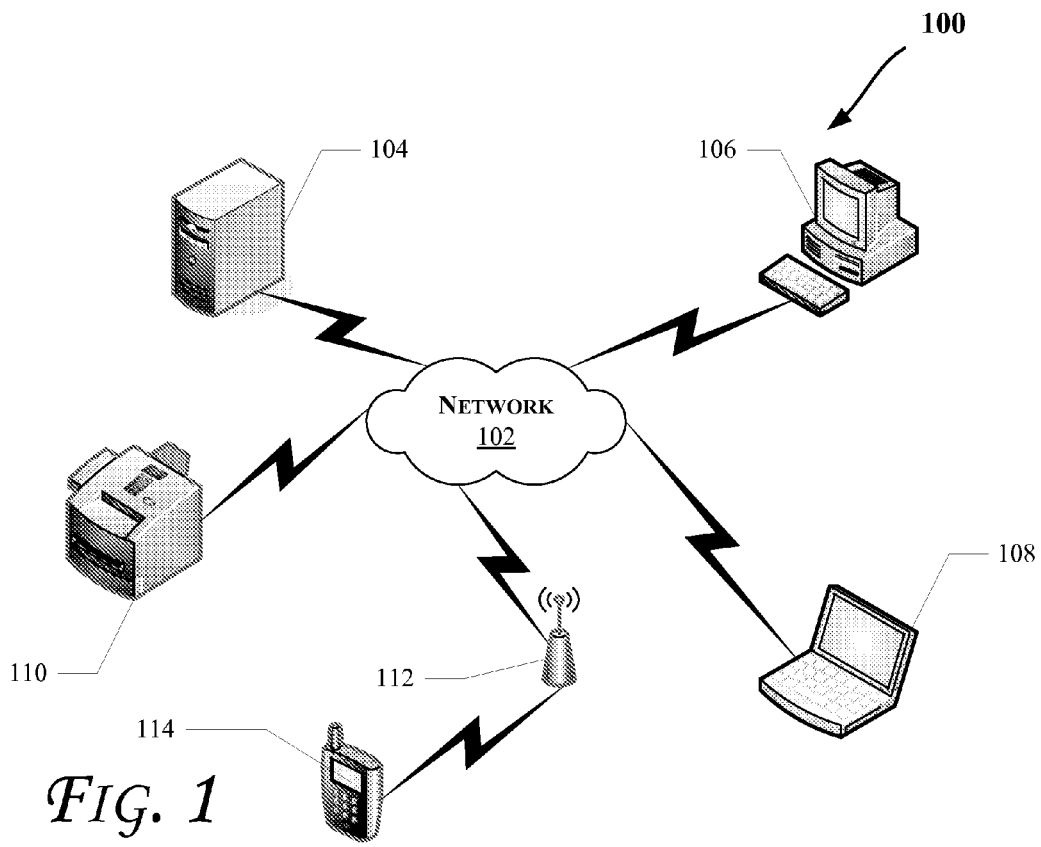
FIGS. 1 and 2 illustrate various components of embodiments of communication systems, which may be utilized to implement one or more embodiments.

Some of the embodiments discussed herein may be implemented in various computing environments such as those discussed with reference to FIGS. 1-2 and 4. More particularly, FIG. 1 illustrates various components of an embodiment of a communication system 100, which may be utilized to implement some embodiments discussed herein. The system 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), etc. The network 102 may be any type of type of a computer network including an intranet, the Internet, and/or combinations thereof.

The devices 104-114 may communicate with the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In some embodiments, more than one access point 112 may be in communication with the network 102. In one embodiment, the wireless access point 112 may include traffic management capabilities. Also, data communicated between the devices 104-114 may be encrypted (or cryptographically secured), e.g., to limit unauthorized access. The network 102 may utilize any communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless local area network (WLAN), WiMAX, wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) such as a network interface card (NIC) or external network interface devices (e.g., having a separate physical enclosure and/or power supply than the computing system to which it is coupled).

Figure 2:
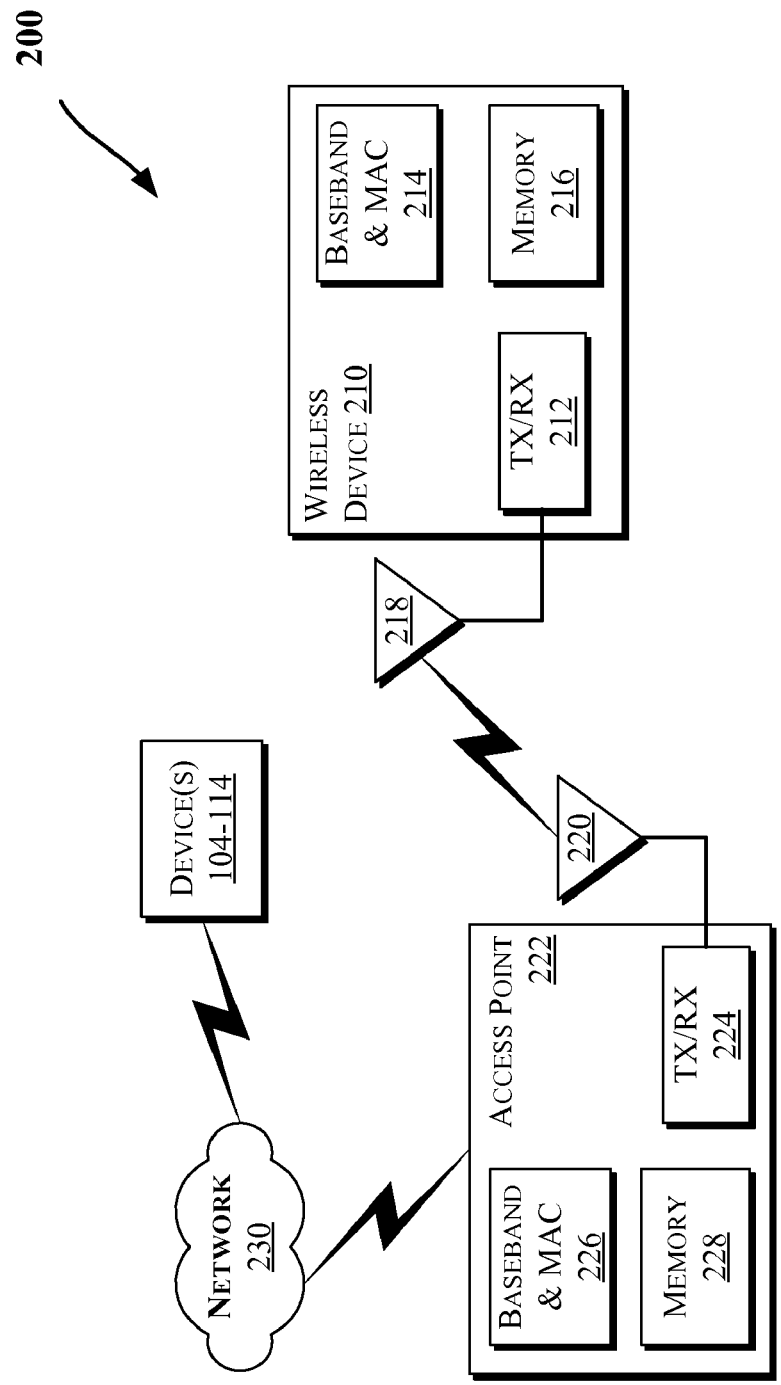

Referring to FIG. 2, a block diagram of a wireless local area or cellular network communication system 200 in accordance with one or more embodiments of the invention will be discussed. In the communication system 200 shown in FIG. 2, a wireless device 210 may include a wireless transceiver 212 to couple to an antenna 218 and to a logic 214 such as a processor (e.g., to provide baseband and media access control (MAC) processing functions). In some embodiment, one or more of the devices 104, 106, 108, 110, or 114 of FIG. 1 may include one or more of the components discussed with reference to the wireless device 210. Hence, in an embodiment, the devices 104, 106, 108, 110, or 114 of FIG. 1 may be the same or similar to the wireless device 210. In one embodiment of the invention, wireless device 210 may be a cellular telephone or an information handling system such as a mobile personal computer or a personal digital assistant or the like that incorporates a cellular telephone communication module. Logic 214 in one embodiment may comprise a single processor, or alternatively may comprise a baseband processor and an applications processor. Logic 214 may couple to a memory 216 which may include volatile memory such as dynamic random-access memory (DRAM), non-volatile memory such as flash memory, or alternatively may include other types of storage such as a hard disk drive. Some portion or all of memory 216 may be included on the same integrated circuit as logic 214, or alternatively some portion or all of memory 216 may be disposed on an integrated circuit or other medium, for example a hard disk drive, that is external to the integrated circuit of logic 214.

Wireless device 210 may communicate with access point 222 via a wireless communication link, where access point 222 may include one or more of: an antenna 220, a transceiver 224, a processor 226, and a memory 228. In some embodiments, the device 210 may directly communicate with other devices capable of wireless communication (e.g., having the same or similar components as discussed with reference to device 210), instead of in addition to communication via the access point 222. In one embodiment, access point 222 may be a base station (BS) of a cellular telephone network and/or a WiMAX network. In an embodiment, access point 222 may be an access point or wireless router of a wireless local or personal area network. In some embodiment, the access point 112 of FIG. 1 may include one or more of the components discussed with reference to the access point 222. Hence, in an embodiment, the access point 112 of FIG. 1 may be the same or similar to the access point 222. In an embodiment, access point 222 (and optionally wireless device 210) may include two or more antennas, for example to provide a spatial division multiple access (SDMA) system or a multiple input, multiple output (MIMO) system. Access point 222 may couple with network 230 (which may be the same or similar to the network 102 of FIG. 1 in some embodiments), so that wireless device 210 may communicate with network 230, including devices coupled to network 230 (e.g., one or more of the devices 104-114), by communicating with access point 222 via a wireless communication link. Network 230 may include a public network such as a telephone network or the Internet, or alternatively network 230 may include a private network such as an intranet, or a combination of a public and a private network. Communication between wireless device 210 and access point 222 may be implemented via a wireless local area network (WLAN). In one embodiment, communication between wireless device 210 and access point 222 may be at least partially implemented via a cellular communication network compliant with a Third Generation Partnership Project (3GPP or 3G) standard. In some embodiments, antenna 218 may be utilized in a wireless sensor network or a mesh network.

Figure 3:
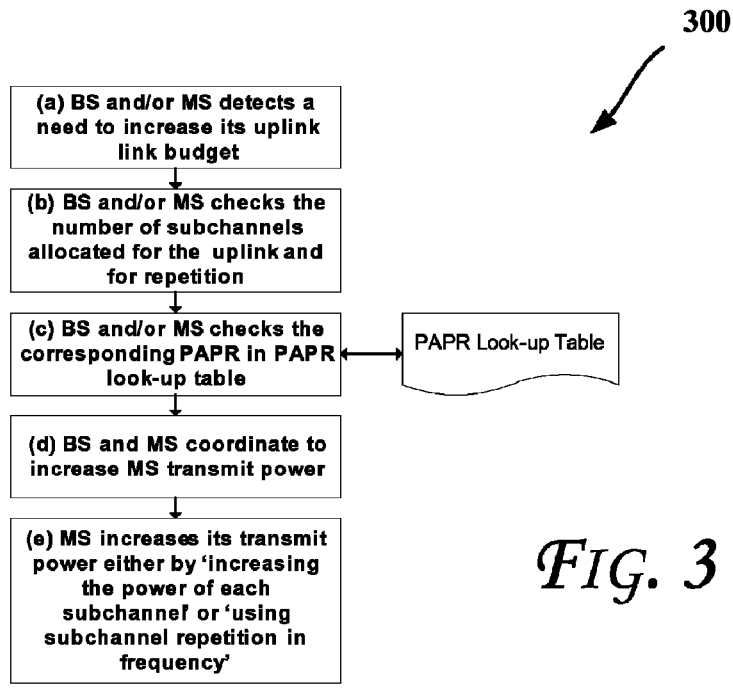
FIG. 3 illustrates a flow diagram of a method, according to an embodiment of the invention.

FIG. 3 illustrates a block diagram of an embodiment of a method 300 to enhance uplink link budget. In one embodiment, since the nominal maximum transmit power capability of a device (such as an MS) corresponds to the case when all subchannels are active, then if the number of active subchannels is reduced, the associated PAPR (Peak to Average Power Ratio) reduction may provide additional transmit power margin beyond the nominal maximum, e.g., provided that the regulatory and performance requirements (such as transmit power limits, spectral mask, Error Vector Magnitude (EVM), etc.) are satisfied. This additional power may then be used to increase the uplink link budget by increasing the power density and/or by subchannel repetition. Moreover, in some embodiments, the method 300 may be utilized in communication systems where OFDMA is used. In an embodiment, the method 300 may be used to enhance uplink link budget of a wireless device such as those discussed with reference to FIGS. 1-2. In an embodiment, various components discussed with reference to FIGS. 1-2 and 4 may be utilized to perform one or more of the operations discussed with reference to FIG. 3.

Referring to FIGS. 1-3, at operation (a), BS (e.g., access point 222) and/or MS (e.g., wireless device 210 or logic therein such as the processor 214) detect a need to increase an MS' uplink link budget. The detection may be performed based on measurements at the BS and/or feedback information to the MS about a channel or subchannel conditions. When BS and/or MS detect whether the uplink link budget of the wireless device is to be increased (a), BS and/or MS (or logic therein such as the processor 226 or 214) check the number of subchannels currently allocated for the uplink and the number of subchannels required for repetition (b). The BS and/or MS may also check the corresponding PAPR (Peak to Average Power Ratio) in a PAPR look-up table (c) (e.g., PAPR table may be stored in any storage device such as the memory 216 and/or 228). In some embodiments, if PAPR table is stored in both memory 216 and memory 228, the table may be synchronized on periodic basis. Alternatively, table synchronization may be performed upon change to any of the table entries. However, synchronization may not be applied in all embodiments. BS and MS then coordinate to increase MS transmit power and/or perform subchannel repetition accordingly (d). MS may increase its transmit power (e.g., the transmit power of antenna 218) to enhance the uplink link budget, e.g., with increasing the transmit power of each subchannel itself, or with subchannel repetition in frequency (e). In an embodiment, any kind of scheme can be used for coordination. For example, any of the following may be used for the coordination: (1) BS may check PAPR look-up table and command MS to increase its transmit power; and/or (2) BS (or access point, e.g., access point 222 or logic therein such as the processor 226) may grant additional bandwidth resources to the uplink to perform subchannel repetition. In an embodiment, the BS may signal increase of transmit power and performance of subchannel repetition separately (e.g., via separate signals being asserted or deasserted depending on the implementation). Alternatively, the BS may signal increase of transmit power and performance of subchannel repetition by a single indication (or signal assertion or deassertion depending on the implementation).

Table 1 below illustrates sample values in accordance with an embodiment. For example, there may be 35 subchannels in UpLink (UL) Partial Usage of SubChannels (PUSC) and 48 subchannels in UL Adaptive Modulation and Coding (AMC) subchannelization in mobile WiMAX system with 10 MHz system bandwidth. Embodiments of the invention may be applied to any other communications systems, e.g., where uplink OFDMA is used even though the terminologies and the specific numbers may be different.

TABLE 1

| | Number of UL Subchannels | |
|---|---|---|
| FFT | PUSC | AMC (2 × 3 bin) |
| 1024 | 35 | 48 |

As shown in Table 2, the PAPR increases as the number of subcarriers (or subchannels) used increases, or PAPR decreases as the number of subcarriers (or subchannels) used decreases. For example, Table 2 illustrates PAPR vs. the number of subchannels used in mobile WiMAX system, e.g., where $X1 \leq X2 \leq X3 \leq \ldots \leq X35$ [dB] and $Y1 \leq Y2 \leq Y3 \leq \ldots \leq Y48$ [dB].

TABLE 2

| | PAPR [dB] for given modulation and probability | |
|---|---|---|
| Number of subchannels | PUSC | AMC (2 × 3 bin) |
| 1 | X1 | Y1 |
| 2 | X2 | Y2 |
| 3 | X3 | Y3 |
| ... | ... | ... |
| 35 | X35 | Y35 |
| ... | | ... |
| 48 | | Y48 |

Figure 6:
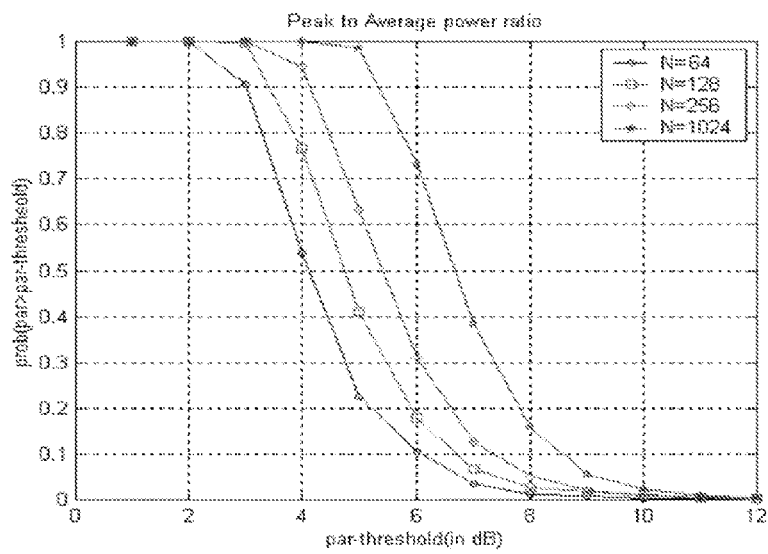
FIGS. 5-6 illustrate various graphs, according to some embodiments.

FIG. 6 illustrates PAPR values with respect to different number of subcarriers, according to an embodiment. In FIG. 6, "N" designates the number of subcarriers. FIG. 6 provides supplemental information regarding Table 2, e.g., clearly indicating where $X1 \leq X2 \leq X3 \leq \ldots \leq X35$ [dB] and $Y1 \leq Y2 \leq Y3 \leq \ldots \leq Y48$ [dB].

Figure 5:
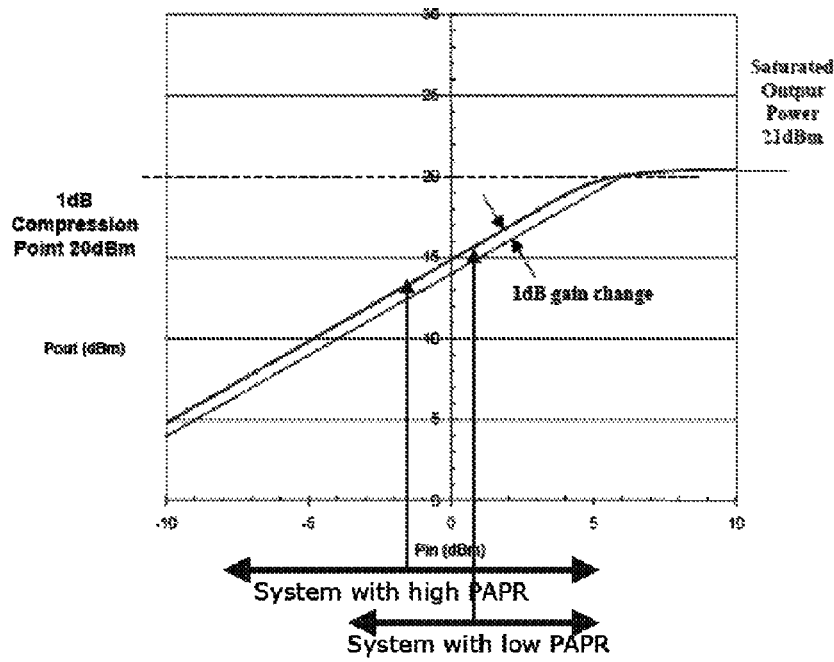

FIG. 5 illustrates one example of the Power Amplifier (PA) transfer curve according to PAPR characteristics, according to an embodiment. Generally, the higher PAPR forces the system to be operated in lower transmit power point, as shown in FIG. 5. Therefore, MS may have room to increase its transmit power by shifting its operating point higher in PA (power amplifier) transfer curve when MS is using only a small number of subchannels. Then, MS may use subchannel repetition to enhance the uplink link budget by using PAPR look-up table (e.g., Table 2). For example, repetition by 2 times may enhance the uplink link budget by 3 dB, repetition by 3 times may enhance the uplink link budget by 4.7 dB, and so on.

Also, in a certain country or region, there may be room for MS to increase its transmit power within regulation boundary. Please see the power class of mobile WiMAX client devices in IEEE std 802.16-2004 in Table 3 and the MS transmit power regulation in South Korea in Table 4 for reference information.

TABLE 3

| Class Identifier | Transmit power (dBm) |
|---|---|
| Class 1 | $17 \leq P_{Tx,max} < 20$ |
| Class 2 | $20 \leq P_{Tx,max} < 23$ |
| Class 3 | $23 \leq P_{Tx,max} < 30$ |
| Class 4 | $30 \leq P_{Tx,max}$ |

Tables 4(a) and 4(b) below show spectral mask requirement for Wireless Broadband (WiBro) MS devices in Korea.

TABLE 4(a)

Minimum requirement for MS with Pavg (average transmit power) less than 23dBm

| Frequency offset (Δf) | Specification | RBW (Resolution Bandwidth) |
|---|---|---|
| ±4.77 MHz ≤ Δf < ±9.27 MHz | $-[26 + 7 \times \{(|\Delta f| - 4.77 \text{ MHz})/4.5 \text{ MHz}\}]$ dB | 100 kHz |
| ±9.27 MHz ≤ Δf < ±13.23 MHz | $-[33 + 4 \times \{(|\Delta f| - 9.27 \text{ MHz})/3.96 \text{ MHz}\}]$ dB | 100 kHz |
| ±13.23 MHz ≤ Δf < ±17.73 MHz | $-[37 + 2 \times \{(|\Delta f| - 13.23 \text{ MHz})/4.5 \text{ MHz}\}]$ dB | 100 kHz |
| ±17.73 MHz ≤ Δf | −39 dB | 100 kHz |

TABLE 4(b)

Minimum requirement for MS with Pavg (average transmit power) more than 23dBm

| Frequency offset (Δf) | Specification | RBW |
|---|---|---|
| ±4.77 MHz ≤ Δf < ±9.27 MHz | $-[\{(P_{avg} - 23) + 26\} + 7 \times \{(|\Delta f| - 4.77 \text{ MHz})/4.5 \text{ MHz}\}]$ dB | 100 kHz |
| ±9.27 MHz ≤ Δf < ±13.23 MHz | $-[\{(P_{avg} - 23) + 33\} + 4 \times \{(|\Delta f| - 9.27 \text{ MHz})/3.96 \text{ MHz}\}]$ dB | 100 kHz |
| ±13.23 MHz ≤ Δf < ±17.73 MHz | $-[\{(P_{avg} - 23) + 37\} + 2 \times \{(|\Delta f| - 13.23 \text{ MHz})/4.5 \text{ MHz}\}]$ dB | 100 kHz |
| ±17.73 MHz ≤ Δf | $-[(P_{avg} - 23) + 39]$ dB | 100 kHz |

Accordingly, without utilizing the techniques discussed herein, MS may not enhance its uplink link budget even though there may be room to increase the transmit power in MS and in uplink cell condition within a system. In some embodiments, MS may enhance the uplink link budget by 3 dB when MS uses 2 times repetition in an embodiment. In the same manner, MS may enhance the uplink link budget by 4.7 dB when MS uses 3 times repetition by using some of the techniques discussed herein.

Figure 4:
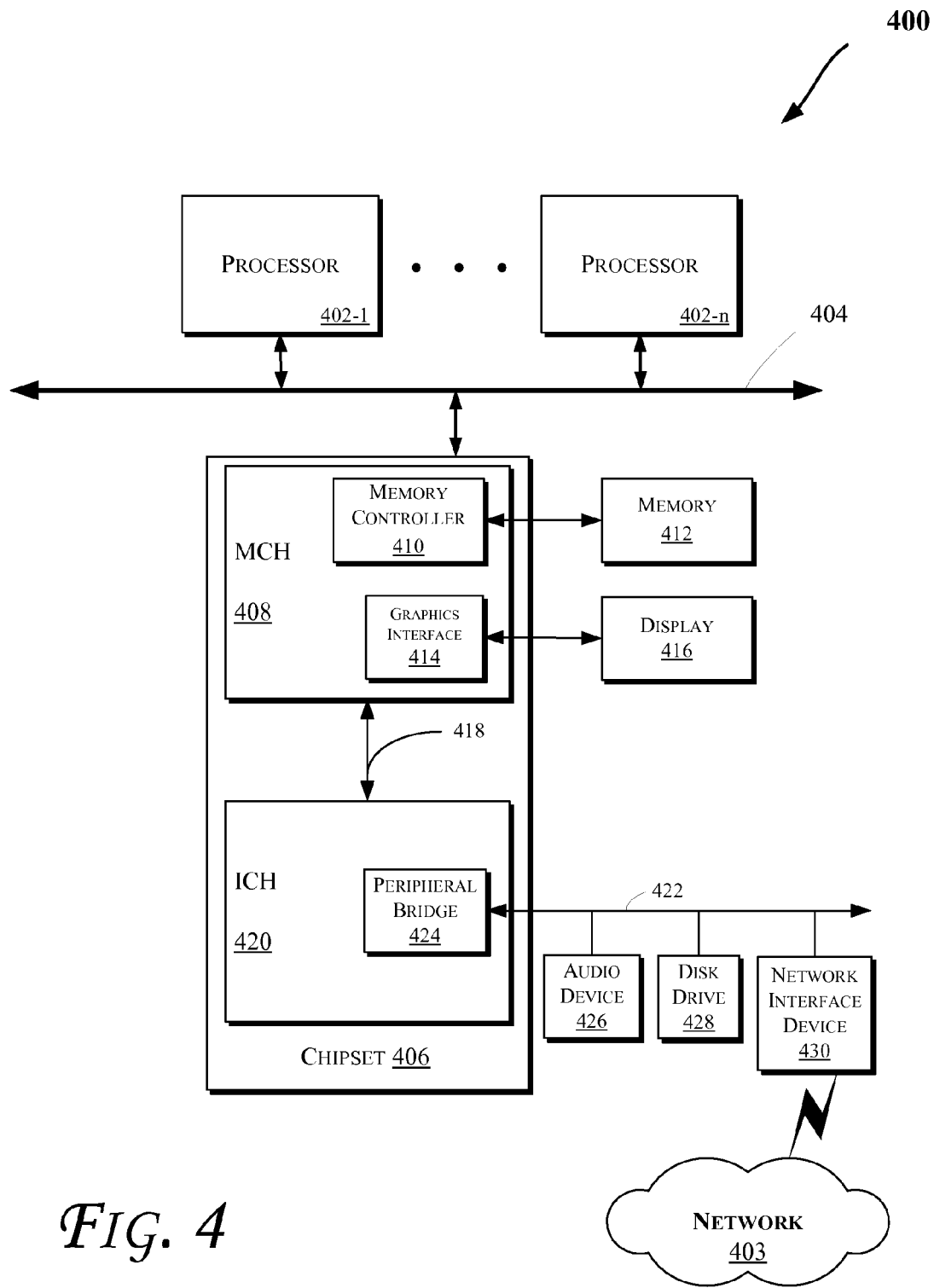
FIG. 4 illustrates a block diagram of an embodiment of computing system, which may be utilized to implement various embodiments discussed herein.

Referring to FIG. 4 illustrates a block diagram of an embodiment of a computing system 400. One or more of the devices 104-114 of FIG. 1 and/or devices 210 or 222 of FIG. 2 may comprise one or more of the components of the computing system 400. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Moreover, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. In an embodiment, the network 403 may be the same or similar to the networks 102 of FIG. 1 and/or 230 of FIG. 2. In one embodiment, the network interface device 430 may include one or more components of the wireless device 210 of FIG. 2. Also, the device 430 may be the same or similar to the device 210 of FIG. 2 in some embodiments. Other devices may communicate via the bus 422. Additionally, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

In various embodiments of the invention, the operations discussed herein, e.g., with reference to the figures, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. A wireless device comprising:
an antenna that to communicate with an access point;
a memory that stores a logic and a peak-to-average power ratio (PAPR) table; and
at least one processor that executes the logic to increase a power transmission by the antenna based at least in part on receiving an indication from the access point to perform subchannel repetition, wherein in response to the indication the at least one processor increases power transmission by repeating at least one subcarrier signal based at least in part on a value indicated by the PAPR table.

2. The wireless device of claim 1, further comprising logic to detect whether an uplink link budget of the wireless device is to be increased.

3. The wireless device of claim 1, further comprising logic to determine a number of subchannels allocated to the wireless device.

4. The wireless device of claim 3, further comprising logic to determine Peak to Average Power Ratio (PAPR) of the allocated subchannels.

5. The wireless device of claim 4, wherein the logic to determine the PAPR of the allocated subchannels is to access a PAPR table to determine the PAPR of the allocated subchannels.

6. The wireless device of claim 1, further comprising logic to detect whether an uplink link budget of the wireless device is to be increased, wherein the access point is to indicate the increase to the transmit power with subchannel repetition in response to the detection.

7. The wireless device of claim 1, wherein the logic is to cause the increase to the transmit power of the antenna and the repetition of the information in response to separate signals.

8. The wireless device of claim 1, wherein the logic is to cause the increase to the transmit power of the antenna and the repetition of the information in response to a single signal.

9. A method comprising:
receiving, by a wireless device containing at least one antenna, an indication by an access point;
retrieving, by the wireless device, a value in a PAPR table; and
increasing, by the wireless device, a transmission power in the antenna based at least in part on the received indication, wherein the increasing the transmission power by repeating at least one subcarrier signal wherein repeating the at least one subcarrier signal is based at least in part on the value in the PAPR table.

10. The method of claim 9, further comprising detecting whether an uplink link budget of the wireless device is to be increased.

11. The method of claim 9, further comprising determining a number of subchannels allocated to the wireless device.

12. The method of claim 11, further comprising determining Peak to Average Power Ratio (PAPR) of the allocated subchannels.

13. The method of claim 9, further comprising determining a PAPR of allocated subchannels by accessing a PAPR table.

14. The method of claim 9, further comprising detecting whether an uplink link budget of the wireless device is to be increased, wherein the access point is to indicate the increase to the transmit power with subchannel repetition in response to the detection.

15. The method of claim 9, further comprising increasing the transmit power of the antenna and repeating the information in response to separate signals.

16. The method of claim 9, further comprising increasing the transmit power of the antenna and repeating the information in response to a single signal.

* * * * *